(12) United States Patent
Richardson et al.

(10) Patent No.: US 7,077,263 B1
(45) Date of Patent: Jul. 18, 2006

(54) BELT FASTENER ASSEMBLY

(76) Inventors: Thomas W. Richardson, 934 Cleveland Rd., Hinsdale, IL (US) 60521; Mary Jane Richardson, 934 Cleveland Rd., Hinsdale, IL (US) 60521

( * ) Notice: Subject to any disclaimer, the term of this patent is extended or adjusted under 35 U.S.C. 154(b) by 0 days.

(21) Appl. No.: 11/247,570

(22) Filed: Oct. 11, 2005

(51) Int. Cl.
*B65G 17/00* (2006.01)

(52) U.S. Cl. .................................... 198/844.2; 24/31 B
(58) Field of Classification Search ............ 198/844.2; 24/37, 31 B, 31 R, 32
See application file for complete search history.

(56) References Cited

U.S. PATENT DOCUMENTS

| | | | |
|---|---|---|---|
| 1,065,943 A * | 7/1913 | Homby | .......................... 24/37 |
| 1,382,799 A | 6/1921 | Purple | |
| 1,659,001 A | 2/1928 | Purple | |
| 3,141,346 A * | 7/1964 | Dean | ............................. 24/37 |

5,599,131 A  2/1997  Julen et al.

\* cited by examiner

*Primary Examiner*—James R. Bidwell
(74) *Attorney, Agent, or Firm*—George H. Gerstman; Seyfarth Shaw

(57) ABSTRACT

A belt fastener assembly for fastening belt ends together comprises: first and second retention plates receiving and retaining substantially abutting belt ends between the plates, and defining a plurality of bolt holes. A plurality of threaded bolts each extend through a bolt hole of each of the first and second plates and also extend through portions of the belt positioned between the plates, to retain the first and second plates and the belt ends together, with nuts carried on the bolts. Washers are also carried on the bolts, each having an aperture and having, in an original condition prior to use, a frustoconical inner area surrounding the aperture to enlarge the aperture to a size of at least the outer diameter of the bolt threads. This facilitates placement of the washers on the bolts. Then, the washers may be flattened to decrease the size of the apertures, to retain the bolts in position extending through a retention plate prior to full assembly.

24 Claims, 3 Drawing Sheets

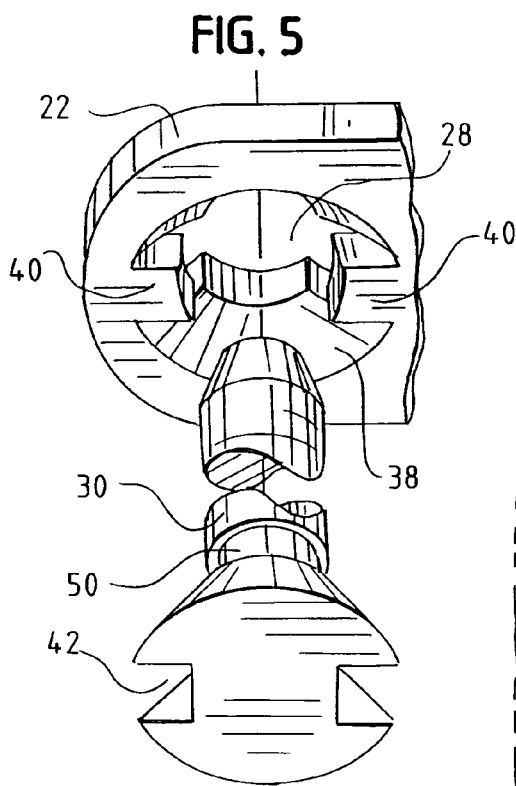
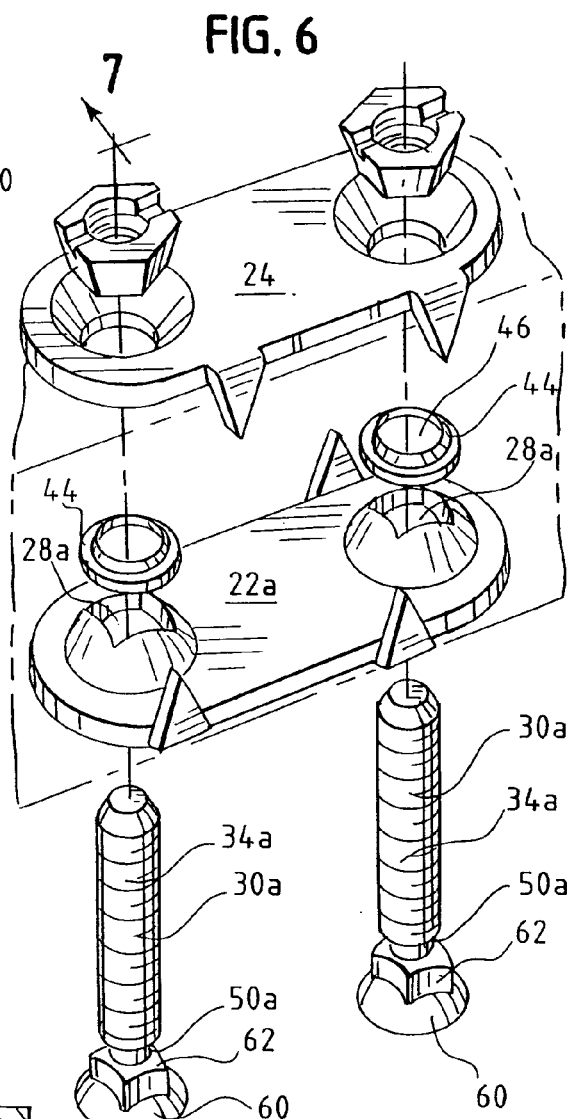
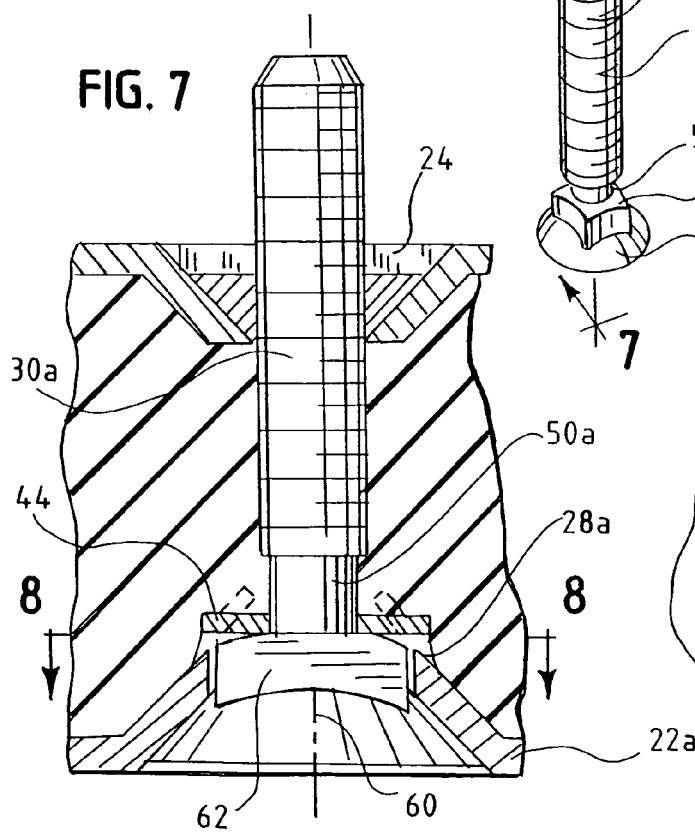
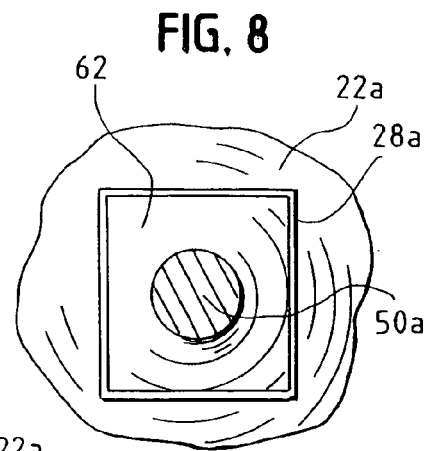

BELT FASTENER ASSEMBLY

BACKGROUND OF THE INVENTION

The use of plate, bolt, and nut conveyor belt fasteners, for attaching together ends of conveyor belts so that they form a closed loop, has been commonplace in mining for many years, as indicated by U.S. Pat. Nos. 1,382,799 and 1,659,001 to G. E. Purple. Typically, such fasteners are made of an upper and lower plate which are connected by bolts and nuts, plus a metal clip to retain the bolt on the bottom plate as it is positioned to the belt. The metal clip of the prior art may have wings designed to spring off the bottom plate as the bolts are tightened. As one example, see plate 21, 22, 24 of FIG. 3 of U.S. Pat. No. 1,659,001.

In another system of a belt fastener, Julen et al., U.S. Pat. No. 5,599,131 discloses a belt fastener having upper and lower plates and bolts in which the bolts are retained in their respective lower plate apertures by washers disposed on the bolt shanks. The washers are made of plastic to deform on tightening and fill in the spaces between the bolts and the lower plate. It is desirable for the bolts to be secured in the lower plates prior to assembly without falling out or rotating.

By this invention, an improved system for conveyor belt fasteners is provided, which does not have to use plastic, rubber or nylon washers which must be soft enough to deform during the assembly process to retain the bolt, and may not function well in very cold or extremely hot temperature. Also, metal assembly clips, when installed on the lower plate, can become "sprung" or loose during the original assembly process or as the bolts are being inserted into the pre-punched holes in the belt.

If special bolts are used, the basic cost will be higher than for standard designs. Assembly and swaging processes, known to the prior art, require costly mechanical equipment and often a significant labor cost. Usually, swaged assemblies are more rigid, and may be more difficult to install in pre-punched holes during field belt splicing operations.

In the prior art, to prevent bolt rotation, bolt heads are trimmed to form grooves. The lower plate is coined in a press to form projections in the groove area so that the bolt head grooves become engaged with the lower plate projections, to prevent the bolt from rotating during the nut tightening process.

It would be desirable to have a technique for preventing bolt rotation that is easier to manufacture and to handle. It would also be desirable to have a simpler way of retaining the bolts in their apertures of the lower plate before the nuts are applied to the bolts, so that they do not fall out, to facilitate the assembly of the belt fastener with the belt ends retained between the two plates.

DESCRIPTION OF THE INVENTION

By this invention, advantages are achieved in both cost and efficiency of assembly and use in a belt fastener system for attaching belt ends together.

By this invention, a belt fastener assembly for fastening belt ends together is provided. The fastener assembly comprises: first and second retention plates receiving and retaining substantially abutting belt ends between the plates. The first and second retention plates each define a plurality of bolt holes. A plurality of bolts having threads are provided, each bolt extending through a bolt hole of each of the first and second plates. The bolts also extend through portions of the belt positioned between the plates, to retain the first and second plates and the belt ends together. Nuts are carried on the ends of the bolts.

By this invention, washers are carried on the bolts, typically adjacent to heads of the bolts. The washers each have an aperture and, in an original condition prior to use, define a funnel-shaped, (or frustoconical) countersink inner area surrounding the aperture, having the effect of enlarging the aperture (when compared with the same washer in planar form) to a size which is enlarged to at least the outer diameter of the bolt threads. This facilitates placement of the washers on the bolts, following which the washers may be flattened with a tool similar to a crimping tool, which has the effect of decreasing the size of the apertures. The apertures are preferably sized so that they engage the bolt shaft in their substantially flattened configuration, so that the bolts are retained in position by the washer, and do not readily fall out from the hole that they occupy in the lower plate, i.e., the lower one of the first and second retention plates through which the bolts project upwardly through the belt. When the bolt is secured into the lower of the first or second plates, this greatly facilitates the placement of the bolts through end portions of the belt to be connected together and through the other plate, putting the belt ends typically in abutting relationship and held there by the bolts and plates.

In some embodiments, the bolts each define heads and, adjacent to each head, a thread-free neck portion of narrower diameter than the thread outer diameter of the bolt. The washers are positioned at the bolt neck portions, being flattened to be retained there, with the washer aperture being reduced by the flattening to typically engage the bolt neck portions, with the washers not engaging the threads.

In some embodiments, bolt holes of at least the plate that is nearest to the bolt heads may be of non-circular shape. At least a section of the bolt neck portions may also be of a non-circular shape (in cross section) which shape is capable of fitting into the nearest bolt holes of non-circular shape, thus preventing bolt rotation. The non-circular shapes may be square, triangular, hexagonal, oval, or the like.

Thus, a belt fastener assembly is provided in which the bolts may be retained by the flattened washers in position in one of the plates, which may be the lower plate, while at the same time the bolts are non-rotatable because of their neck portion which is of non-circular shape and the bolt holes in the plate which are also of non-circular shape. The abutting belt end portions may then be threaded onto the bolts, holes being typically punched in the belt ends to allow easy bolt penetration. Then, the second plate is applied to the bolts, and nuts are tightened thereon to secure the belt fastener assembly with the fastened belt ends.

Typically, the bolts have tapered, free ends to facilitate penetration of the belt holes and bolt holes in the plates.

If desired, the bolts having neck portions of non-circular shape, interacting with one of the retention plates having bolt holes of non-circular shape, may be utilized without using the washers having the countersink inner area as described above, to provide non-rotating bolts which may be held in place in one of the retention plates in a conventional, prior art manner. Similarly, washers in accordance with this invention may be used without the presence of bolts having non-circular neck portions, and the bolts may be held in non-rotating relation in a conventional manner of the prior art.

DESCRIPTION OF THE DRAWINGS

FIG. 5 is an enlarged, perspective, exploded view of a bolt entering a bolt hole of a lower retention plate of the belt fastener assembly.

FIG. 6 is an exploded, perspective view of another embodiment of the belt fastener assembly of this invention.

FIG. 7 is an enlarged, sectional view, taken along line 7—7 of FIG. 6, of the assembled belt fastener assembly, with abutting belt ends retained therein.

FIG. 8 is a sectional view taken along line 8—8 of FIG. 7.

DESCRIPTION OF SPECIFIC EMBODIMENTS

Figure 1:
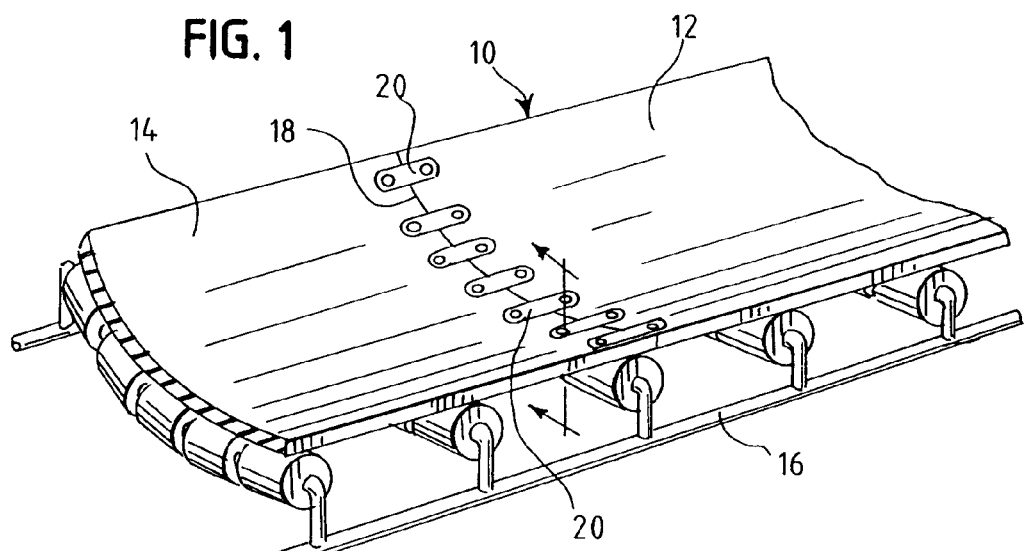
FIG. 1 is a perspective view of a conveyor belt showing a length of belt carried on rollers (which belt generally forms a closed loop) with portions of the belt removed for clarity.
Figure 2:
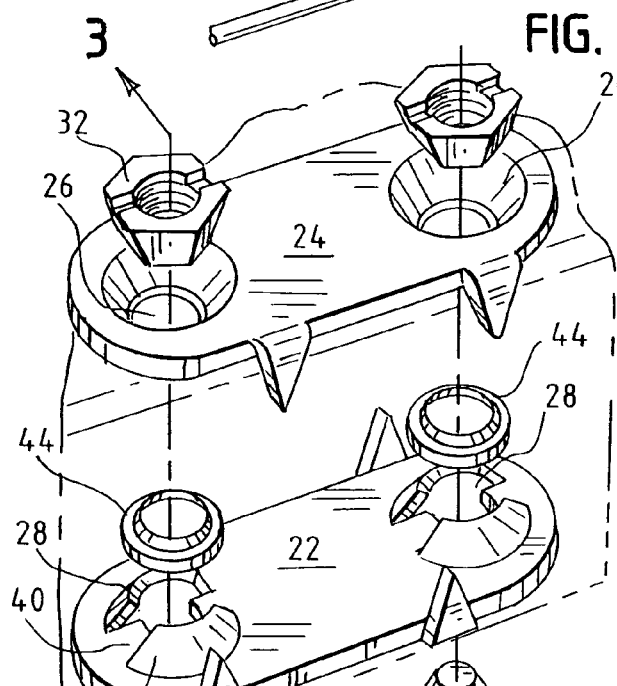
FIG. 2 is an exploded, perspective view of one embodiment of a belt fastener assembly of this invention.

Referring to FIG. 1, a fragmentary, perspective view of a conveyor belt system 10 is shown comprising two abutting end portions 12, 14 of a conveyor belt carried on a roller system 16, and typically forming an elongated loop in conventional manner. End portions 12,14 abut together at line of abutment 18, and are secured by a plurality of belt fastener assemblies 20 designed in accordance with this invention. Such conveyor belt systems 10 may be used in mining, manufacturing, and the like.

Referring also to FIGS. 2–5, the details of one embodiment of a belt fastener assembly in accordance with this invention are shown. First and second retention plates 22, 24 are respectively provided with bolt holes 26, 28, respectively receiving bolts 30, in which each bolt 30 extends through a pair of bolt holes 26, 28. Nuts 32 attach to helically threaded portions 34 of bolts 30, in a generally conventional manner.

It can be seen that retention plate 22 can be the lower plate, with the bolts extending upwardly therethrough, with bolt head 36 positioned in an indentation 38 surrounding bolt hole 28.

It can be seen that indentation 38 is a generally of (inverted) frustoconical shape except for a pair of opposed, horizontal projections 40, which are proportioned to fit into recesses 42 of each bolt head 36, to prevent bolt rotation, in a conventional manner.

In accordance with this invention, washers 44 are provided, being made of plastic, a metal such as steel, or the like. As can be seen from FIG. 4A, prior to use, that each washer 44 has an aperture 46 which is surrounded by a countersink inner area 48, typically of funnel shape. Aperture 46 is of the size of at least the outer diameter of bolt threads 34, so that washer 44 may be easily placed on its bolt 30. Then, in one embodiment, washer 44 may be flattened by an appropriate tool, as shown in FIG. 4B, and FIGS. 9–10A, causing the diameter of aperture 46 to be reduced by the flattening.

Figure 3:
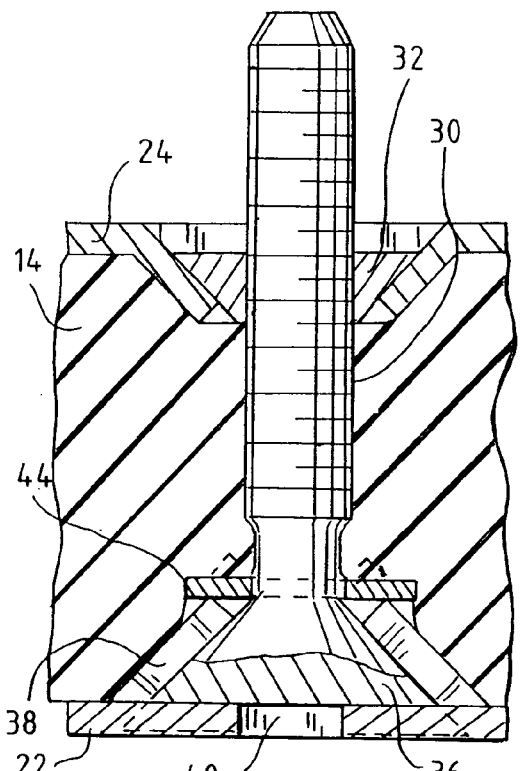
FIG. 3 is an enlarged, sectional view taken along line 3—3 of the belt fastener assembly, in assembled form, with abutting belt end portions included.
Figure 4A:
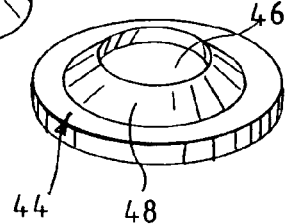
FIG. 4A is a perspective view of a washer used in the configuration of FIGS. 2 and 3, prior to flattening, as further illustrated in FIG. 2.
Figure 4B:
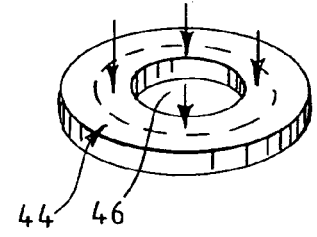
FIG. 4B is a perspective view of the same washer after flattening, as further illustrated in FIG. 3.

Bolts 30 preferably are not threaded for their entire length to heads 36, but, rather, they may have a thread free area 50, preferably of lesser diameter than the outer diameter of threads 34. When washer 44 is flattened by a tool or the like, the diameter of aperture 46 is reduced, preferably to a degree that engages narrower neck portion 50, with aperture 46 becoming of lesser diameter than the outer diameter of threads 34, so that washer 44 retains bolt 30 in its position extending through lower plate aperture In fact, by this invention, a semi-finished portion of the belt fastener assembly can be produced, comprising a lower plate (first plate) 22, having the bolt emplaced in hole 28, and the flattened washer 44 gripping the neck portion of bolt 30 (and not engaging threads 34) so that the end user has a semi finished assembly, ready to apply to a belt to link abutting belt ends together as in FIG. 1. This frees the user from the need to place the bolts through lower plate 22 and to secure them, since that is already done in the purchased product, providing a significant labor reduction. In FIG. 3, that combination of lower plate 22, bolt 30, and flattened washer 44 as a bolt retainer is shown. It is assembled into a complete belt fastener assembly, with a belt portion 14 positioned between plates 22 and 24, secured in place by nut 32. The former, frustoconical shape of washer 44 is shown by broken lines in FIGS. 3 and 7.

Referring to FIGS. 6–8, another embodiment of the belt fastener assembly of this invention is shown. First retention plate 22a has a different design of bolt holes 28a, although second retention plate 24 may be of the same design as in the previous embodiment. It can be seen that the areas around bolt holes 28a are, as before, optionally of a generally frustoconical configuration, but that the actual aperture is, in this embodiment, square and not substantially circular as in the previous embodiment.

Bolts 30a are modified at their head portions 60 with the deletion of the recesses 42 of the previous embodiment and the addition, at neck portion 50a, of a non-circular (such as square) portion 62. Portion 62 is shaped and dimensioned to fit into the square aperture 28a of plate 22a, as shown in FIG. 7, so that bolts 30a do not rotate when properly placed in plate 22a and apertures 28a. Then, washers 44, which may be of similar design to those of the previous embodiment, are threaded on bolts 30a, passing along the threaded portions 34a thereof, because washer apertures 46 are sized preferably slightly greater in diameter than the outer diameter of threads 34a. When each washer 44 is placed about bolt neck 50a, it may be flattened by the appropriate flattening tool, which may be of any design selected by those skilled in the art, causing washer aperture 46 to reduce in diameter, preferably to a size where it grips bolt neck 50a, thus retaining each bolt 30a in its position extending upwardly through first retention plate 22a. As previously stated, it may be desirable for the manufacturer to provide such a sub-assembly comprising first plate 22a, having bolts 30a projecting through bolt holes 28a, and secured there by flattened washers 44.

This invention shows advantage when used with washers made of steel or other metal, since the strength and durability advantages of a metal washer can be combined with the other advantages of this invention.

Figure 9:
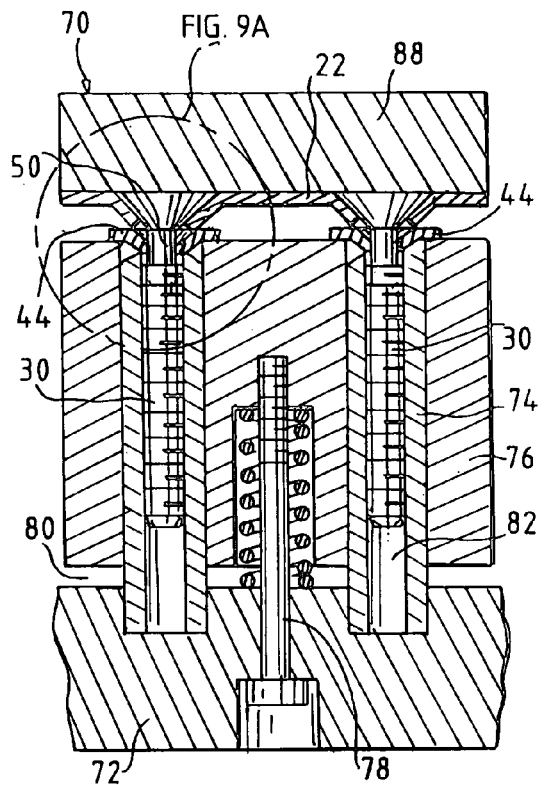
FIG. 9 is a transverse sectional view of a lower retention plate having bolts penetrating therethrough, and equipped with washers having the described frustoconical portion. The assembly is a fixed in a machine for flattening the washers to cause them to grip the bolts.
Figure 9A:
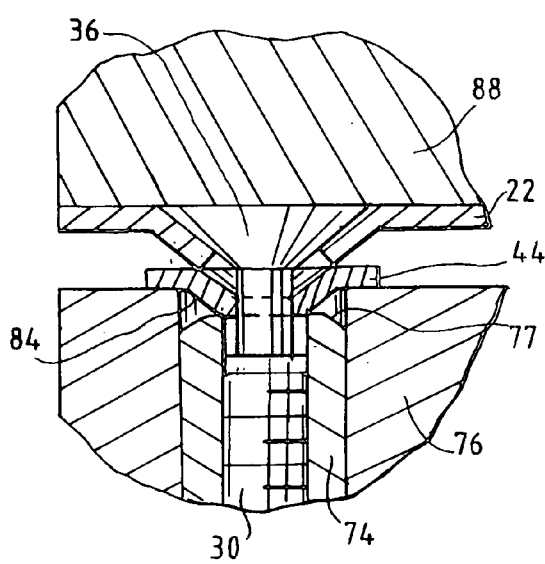
FIG. 9A is an enlarged view of a portion of FIG. 9.

Referring to FIGS. 9 and 9a, preprocessed plate 22, with attached bolts 30 and flattened washers 44, inverted relative to FIG. 3 and prior to installation in belt 14, is shown to be mounted in an apparatus 70 for flattening washers 44 as described above. Apparatus 70 comprises a base 72, which carries tubular flattening members 74 in stationary manner, and which carries a sliding jig 76 which reciprocates upwardly and downwardly on spring biased post 78, being biased in the upward position to leave a space 80 below it.

Bolts 30 are inserted into the bores 82 of the tubular flattening members 74, with bolts 30 extending through plate 22, with washers 44 in their original, frustoconical shape resting in a recess 84 formed in member 76 at the top 77 of tubular flattening member 74. Thus, washers 44 can be easily dropped in the recess; plate 22 may be added on top, and bolts 30 may be threaded through both of them by a simple dropping action.

Figure 10:
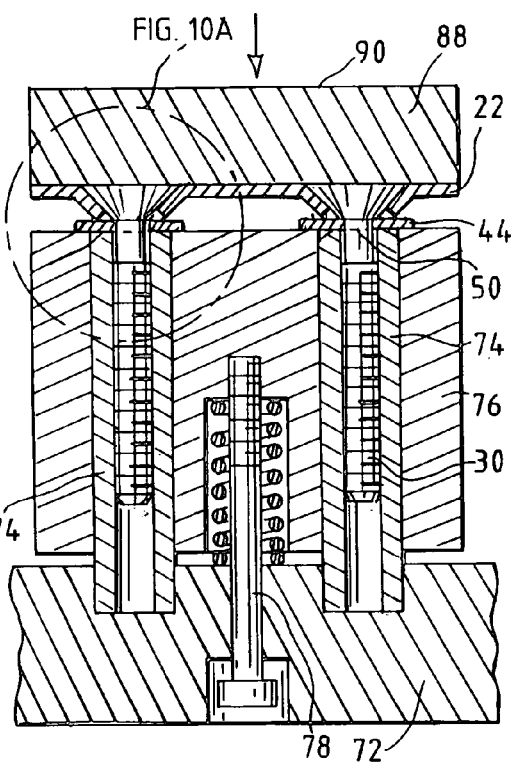
FIG. 10 is a transverse sectional view of FIG. 9, taken after the device has flattened the washers into gripping relation with the bolts.
Figure 10A:
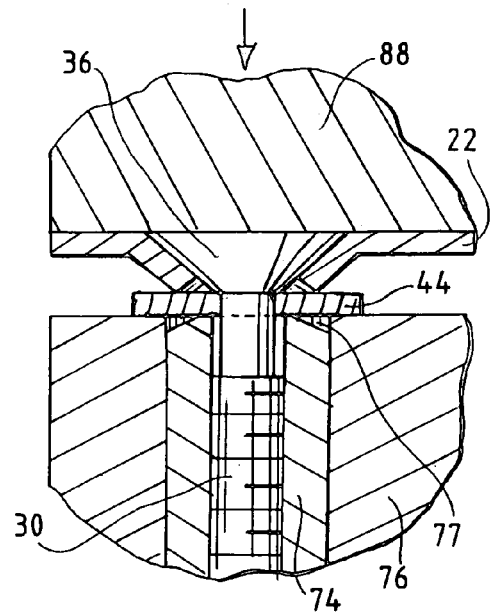
FIG. 10A is an enlarged view of a portion of FIG. 10.

Then, in FIGS. 10 and 10a, after addition of upper plate 88, upper plate 88 is pressed down firmly from the top 90 as shown in FIG. 10 (in comparison to FIG. 9), to push member 76 downwardly relative to stationary, tubular flattening members 74, thus forcing washers 44 to flatten. As stated previously, as the washers 44 flatten, their central apertures 46 are reduced in size, to grip neck 50 of each bolt 30, thus securing each bolt 30 in locked position relative to plate 22.

Then, this assembly of plate 22, bolts 30, and washers 44 may be transported to the customer, or used on the spot, in the manner described above to form the belt fastener assembly of this invention.

Thus a belt fastener assembly is provided in which the bolts extending through the first (typically lower) retention plate may be secured in position before assembly, for ease of assembly, and are also non-rotating, without the need for an extra clip as has been done in the prior art, or the need for plastic which may deform by extrusion to retain the bolts, although durable plastic washers such as nylon may be used if desired in accordance with this invention, instead of metal washers.

The above has been offered for illustrative purposes only, and is not intended to limit the scope of the invention of this application, which is as defined in the claims below.

What is claimed is:

1. A belt fastener assembly for fastening belt ends together, which comprises:
    first and second retention plates receiving and retaining substantially abutting belt ends between said plates, said first and second retention plates each defining a plurality of bolt holes;
    a plurality of bolts having threads defining an outer diameter, each bolt extending through a bolt hole of each of the first and the second plates, said bolts also extending through portions of said belt positioned between said plates to retain said first and second plates and the belts end together;
    nuts carried on the ends of said bolts; and
    washers carried on said bolts, said washers each having an aperture and having, in an original condition prior to use, a frustoconical inner area surrounding said aperture to enlarge the aperture to a size of at least the outer diameter of said bolt threads, to facilitate placement of said washers on said bolts, whereby said washers may be flattened to decrease the size of said apertures to retain the bolts in position.

2. The belt fastener assembly of claim 1 in which said bolts each define, heads and, adjacent to said head, a neck portion of narrower diameter than the thread outer diameter of the bolt, said washers being positioned at said bolt neck portions and not engaging the threads.

3. The belt fastener assembly of claim 2 in which bolt holes of the plate nearest to said bolt heads are of non-circular shape, at least a section of said bolt neck portions being of a non-circular shape in cross section and capable of fitting into said nearest bolt holes, to prevent bolt rotation.

4. The belt fastener assembly of claim 3 in which said non-circular shapes are square.

5. The belt fastener assembly of claim 4 in which said bolts have tapered, free ends.

6. The belt fastener assembly of claim 1 in which said bolts have tapered, free ends.

7. The belt fastener assembly of claim 1 in which the bolt holes of the plate that is nearest to heads of said bolts are of non-circular shape, at least a section of said bolts being of non-circular shape in cross section and capable of fitting into said nearest bolt holes, to prevent bolt rotation.

8. The belt fastener assembly of claim 7 in which said non-circular shapes are square.

9. In a belt fastener assembly having apertured belt retention plates and threaded retaining bolts which extend through apertures of said retention plates, the improvement comprising:
    a washer on a bolt, which washer defines, in an original condition prior to use, a frustoconical inner area surrounding an aperture of said washer, to facilitate placement of said washer on a bolt, and subsequently to be at least partially flattened to retain the bolt in position.

10. The belt fastener assembly of claim 9 in which said retaining bolt which carries said washer defines a head portion and a neck portion, said bolt neck portion being of narrower diameter than the outer diameter of the threaded part of the retaining bolt, said washer being positioned at said bolt neck portion and pressed to cause the frustoconical inner area to be at least partially flattened to reduce the size of the aperture of said washer.

11. The belt fastener assembly of claim 10 in which said bolt holes of the plate that is nearest to heads of said retaining bolts are of non-circular shape, and at least a section of said bolt neck portion is of a non-circular shape in cross section, said non-circular neck portion being capable of fitting into a bolt hole of said plates nearest to said bolt heads, to prevent bolt rotation.

12. The method of assembling a belt fastener assembly for fastening ends of belt material together, which comprises:
    placing said ends of said belt material between first and second retention plates, each defining a plurality of bolt holes;
    inserting a plurality of threaded bolts through the bolt holes of the first and second plates, and through portions of said belt material, to hold the belt ends together between the first and second plates, while providing to at least some of said bolts, adjacent to heads of said bolts, washers which each have an aperture, and also have, in an original condition prior to use, a frustoconical inner area surrounding said aperture, said aperture being of a size of at least the outer diameter of said bolt threads; and
    at least partially flattening said washers to decrease the size of said apertures as the nuts and bolts are tightened.

13. The method of claim 12 in which at least some of said bolts define, adjacent to the bolt head, a neck portion of narrower diameter than the thread outer portion of the bolt, said washers being positioned at said bolt neck portions, with the size of the apertures of said washers being decreased by said flattening to a dimension of less than the outer diameter of the thread of the bolt on which the washer is carried.

14. The method of claim 13 in which the bolt holes of the plate which is nearest to the bolt heads are of non-circular shape, at least a section of said bolt portions being of a non-circular shape in a cross section which is capable of fitting into said nearest bolt holes, to prevent bolt rotation.

15. The method of claim 14 in which said non-circular shapes are square.

16. A belt fastener assembly for fastening belt ends together, which comprises:
  first and second retention plates receiving and retaining substantially abutting belt ends between said plates, said first and second retention plates each defining a plurality of bolt holes;
  a plurality of bolts having threads defining an outer diameter, each bolt extending through a bolt hole of each of the first and second plates, said bolts also extending through portions of said belt ends positioned between said plates to retain said first and second plates and belt ends together, said bolts each defining heads, and, adjacent to said head, a portion of said bolt being of a non-circular shape in cross section, further in which bolt holes of said plate that are nearest to said bolt heads are of a non-circular shape, said non-circular bolt portions being capable of fitting into said nearest bolt holes, to prevent bolt rotation.

17. The belt fastener assembly of claim 16 in which said non-circular shapes are square.

18. The belt fastener of claim 16 in which said bolts have tapered, free ends.

19. A component for a belt fastener assembly for fastening belt ends together, which comprises:
  a first retention plate for cooperating with a second retention plate and receiving and retaining substantially abutting belt ends between said plates, said first retention plate defining a plurality of bolt holes;
  a plurality of bolts having threads defining in an outer diameter, each bolt extending through a bolt hole of said first retention plate, each said bolt having a head on one side of the retention plate;
  a washer carried on each said bolt on the other side of said plate, said washers each having an aperture, and also having, in an original condition, a frustoconical inner area surrounding said aperture, said aperture being of a size of at least the outer diameter of said bolt threads, said washers being flattened from said original condition, with said aperture being reduced to no larger in diameter than the outer diameter of the bolt threads whereby said washer engages said bolt and retains it in its position extending through said bolt hole.

20. The belt fastener assembly component of claim 19 in which said bolts each define, adjacent to said head, a neck portion of narrower diameter than the thread outer diameter of the bolt, said flattened washers being positioned at said bolt neck portions, with apertures of said flattened washer being of less diameter than the diameter of said bolt threads.

21. The belt fastener assembly component of claim 19 in which bolt holes of the first plate are of non-circular shape, at least a section of said bolt neck portions being of a non-circular shape in cross section and capable of fitting into said nearest bolt holes, to prevent bolt rotation.

22. The belt fastener assembly component of claim 19 in which said non-circular shapes are square.

23. The method of securing a bolt to a plate, which comprises:
  inserting a threaded bolt through a bolt hole of a plate while providing to said bolt a washer on the opposite side of the plate to a head of said bolt, said washer having, in an original condition, a frustoconical inner area surrounding said aperture, said aperture being of a size of at least the outer diameter of said bolt threads; and
  at least partially flattening said washers to decrease the size of said apertures as the nuts and bolts are tightened.

24. The method of claim 23 in which said bolt defines, adjacent to the bolt head, a neck portion of narrower diameter than the thread outer portion of the bolt, said washers being positioned at said bolt neck portions, with the size of the apertures of said washers being decreased by said flattening to a dimension of less than the outer diameter of the thread of the bolt on which the washer is carried.

* * * * *